H. TATUM.
COMBINED PLANTER AND FERTILIZER DISTRIBUTER.
APPLICATION FILED SEPT. 8, 1908.
923,909.
Patented June 8, 1909.
2 SHEETS—SHEET 1.
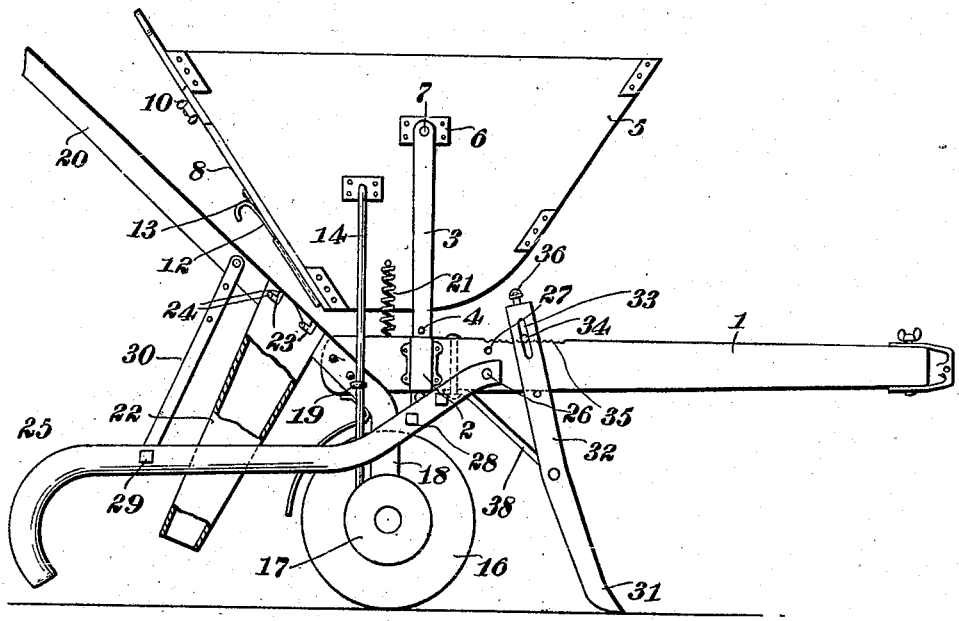
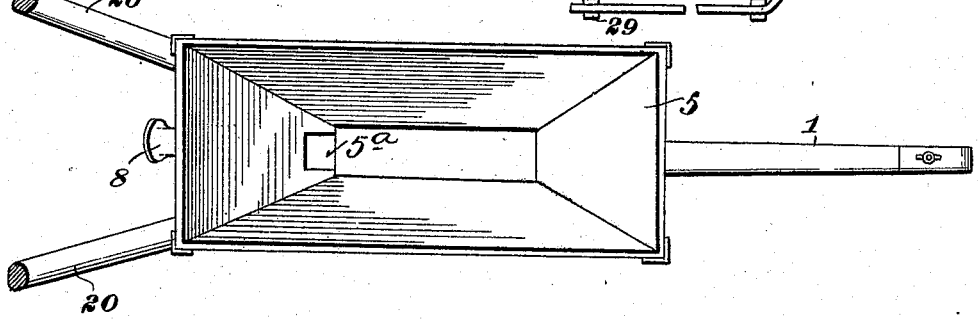
Witnesses
Inventor
Hamling Tatum,
By
R. H. A. Lacey, Attorneys

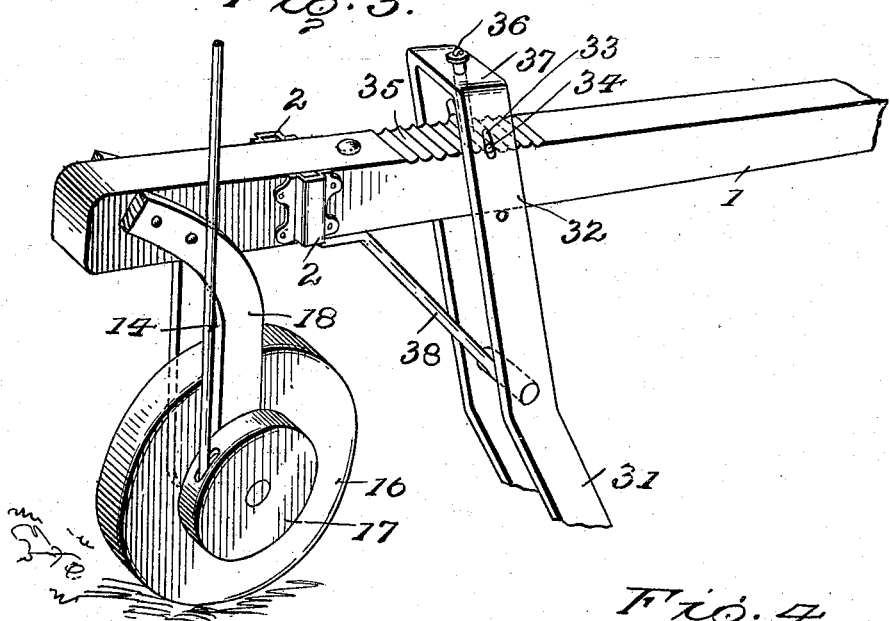
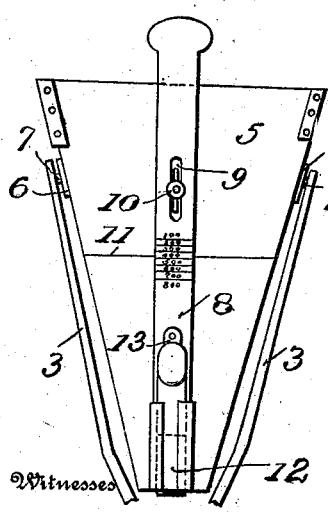
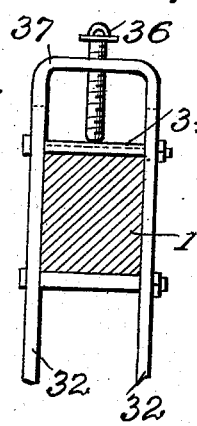
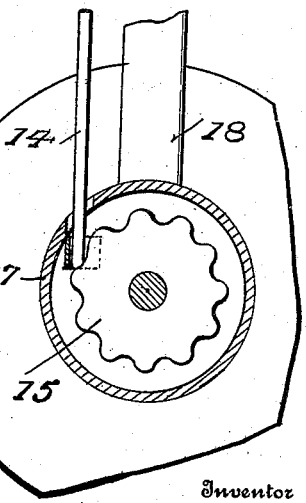

UNITED STATES PATENT OFFICE.

HAMLING TATUM, OF ELBA, ALABAMA.

COMBINED PLANTER AND FERTILIZER-DISTRIBUTER.

No. 923,909.    Specification of Letters Patent.    Patented June 8, 1909.

Application filed September 8, 1908. Serial No. 451,962.

*To all whom it may concern:*

Be it known that I, HAMLING TATUM, citizen of the United States, residing at Elba, in the county of Coffee and State of Alabama, have invented certain new and useful Improvements in Combined Planters and Fertilizer-Distributers, of which the following is a specification.

This invention comprehends certain new and useful improvements in agricultural implements and relates particularly to an improved fertilizer distributer, or cotton seed planter and double or single standard or stock, the invention consisting in certain constructions, arrangements and combinations of the parts that I shall hereinafter fully describe and claim.

For a full understanding of the invention, reference is to be had to the following description and accompanying drawings in which:

Figure 1 is a side elevation of an agricultural implement constructed in accordance with my invention, Fig. 2 is a top plan view thereof, Fig. 3 is a perspective view of the rear end of the beam, showing the traveling wheel and the standard or stock arranged in front of the same, Fig. 4 is a sectional view illustrating the engagement between the actuating rod and the actuating wheel, Fig. 5 is a transverse section of the beam showing the means for attaching the standard or stock thereto, Fig. 6 is a rear end view of the hopper. Fig. 7 is a detail top plan view of the stock or standard.

Corresponding and like parts are referred to in the following description and indicated in all the views of the accompanying drawings by the same reference characters.

Referring to the drawings, the numeral 1 designates the beam of my improved combined planter and fertilizer distributer which is provided near its rear end with socket plates 2 secured by screws or similar fastening devices to the side edges of the beam as shown. Supporting bars 3 have their lower ends slipped downwardly into the socket plates 2, said supporting arms being thereby mounted upon and carried by the beam and extending upwardly therefrom as shown; preferably the two arms are connected together as by a bolt 4 extending therethrough above the beam. A hopper or receptacle 5 for the fertilizer or the like is mounted between the upwardly projecting ends of the supporting arms 3 and is provided at opposite sides with plates 6, said plates being respectively formed with lugs 7 fitting in apertures formed in the upper extremities of the supporting arms so as to pivotally swing the receptacle or hopper between said arms for a rocking movement about a horizontal axis. The hopper 5 is provided at the rear end of its bottom with a discharge opening 5$^a$ for the fertilizer or the like, said opening being controlled by means of a sliding gate 8. This gate is mounted for a limited vertical movement and formed with a longitudinally extending slot 9, and a gaging screw 10 is received in said slot and is designed to be tightened against the gate so as to hold the same securely at different vertical adjustments, according to the required amount of fertilizer to be dropped per acre. Preferably the rear side of the hopper is formed with an indicating line 11 and the rear side of the gate displays a series of numbers to indicate the different amounts that will be fed according to the different vertical adjustments of the gate.

12 designates a cut-off which is mounted at the lower end of the gate and which is pressed upon by a spring 13 as shown. By means of this cut-off, the discharge opening of the hopper may be entirely closed at the end of the row, without changing the adjustment of the gate proper 8.

In order to shake or vibrate the hopper 5 and thus feed the materials therefrom, the said hopper is provided at either or both sides with an actuating rod 14 preferably rigidly connected thereto at its upper end, extending downwardly and case-hardened at its lower end, where it engages an actuating tooth wheel 15 mounted to turn with the main supporting wheel 16. Preferably the lower end of the actuating rod and actuating wheel are inclosed in a case 17 secured to one of the braces 18 by screws or similar fastening devices. The actuating rod 14 is held securely in place for proper movement by means of an eye 19 through which it passes, said eye being secured to one of the handles 20 of the implement.

21 designates a spring which is secured at one end to one side of the hopper and at its other end to the beam 1 near the rear end of the latter in order to limit the vibratory movement of the hopper as the same is vibrated by means of the wheel 15 and the actuating rod 14 engaging therewith.

In order to distribute the fertilizer material, or the like as it is dropped from the hopper 5 I have provided a conducting boot 22 which is detachably supported from the handles 20 near the lower ends thereof, said boot, in the present instance, being formed at its upper ends with slots 23 designed to engage studs 24 projecting from the handles in order to securely yet detachably hold the boot in proper relation to the discharge opening of the hopper.

25 designates a double stock or standard which is secured as by the transverse bolt 26 to the beam near the rear end thereof, said bolt passing through any one of a series of transverse openings 27 formed in the beam, and the said double stock or standard comprises front and rear transverse rods 28 and 29 which extend through both wings thereof, the rearmost rod 29 being preferably screwed thereto at its ends for the purpose of widening the distance between the two wings of the stock or standard.

30 designates a brace which is secured to the stock or standard as by direct attachment to the rod 29 and which is provided at its upper end with a plurality of apertures any one of which is designed to receive a bolt for securing it detachably to one of the handles 20 so that the stock or standard can be raised or lowered as required.

It is to be understood that the distributer and double stock or standard features may be stripped from the remaining portions thereof, leaving a single stock or standard, it being only necessary to lift off the conducting boot 22 and detach it from the handles 20 to remove the double stocks which latter can be easily accomplished by removing the bolts thereof.

In front of the traveling wheel 16 is a shovel 31 the standard 32 of which is of double formation as shown and straddles the beam 1. The two members of the standard are formed in their upper ends with longitudinal slots 33 through which a transverse bolt 34 extends, said bolt being designed to rest on the transversely grooved portion 35 of the beam. A set screw 36 works downwardly through the cross bar 37 that connects the upper ends of the two standard members, said set screw bearing against the transverse bolt 34 and thereby securely holding the standard in place.

38 designates a stay which is secured at its front end to a transverse bolt extending through or between the two standards 32, the rear end of said stay being secured by a vertical bolt to the beam 1 as clearly illustrated in the drawing.

In the practical operation of my improved distributer, it is manifest from the foregoing description in connection with the accompanying drawing that as the implement is drawn over the field, the rotation of the traveling wheel 16 and the consequent rotation of the actuating wheel 15 will impart a vibrating movement to the actuating rod 14, and the said rod will, in turn, rapidly rock the hopper 5 and shake the same so as to cause the material to drop therefrom into the conducting boot 22, if such boot be used. The amount of material dropped may be regulated by means of the gate 8, and at the end of the row, the entire supply may be cut off by pressing the spring-pressed cut-off 12 downwardly to close the discharge opening of the hopper.

Having thus described the invention, what is claimed as new is:—

1. A machine of the character described, comprising a traveling wheel, a beam mounted thereon, a hopper mounted above the beam and supported thereby, handles secured to said beam in the rear of said hopper, the hopper being provided with a discharge opening and a conducting boot provided at its upper end with bayonet slots, the handles being formed with lugs designed for engagement in said slots and arranged to detachably suspend the boot from the handles in operative relation to the discharge opening of the hopper.

2. An implement of the character described, comprising a beam, a traveling wheel upon which said beam is mounted, supporting arms secured to and projecting upwardly from said beam, a hopper pivotally mounted on said arms, a rod secured to the hopper and extending downwardly therefrom, an actuating wheel movable with the traveling wheel and arranged to engage the lower end of said actuating rod, and a case supported alongside of the traveling wheel and inclosing the actuating wheel and formed with an opening through which the lower end of the actuating rod extends into engagement with the actuating wheel.

In testimony whereof I affix my signature in presence of two witnesses.

HAMLING TATUM. [L. S.]

Witnesses:
L. C. POWELL,
M. J. BOWDEN.